(12) United States Patent
Geddes et al.

(10) Patent No.: US 7,068,995 B1
(45) Date of Patent: Jun. 27, 2006

(54) SYSTEM AND METHOD FOR AFFINITY MARKETING IN A WIRELESS NETWORK

(75) Inventors: Martin R. Geddes, Overland Park, KS (US); David J. Anderson, Seattle, WA (US)

(73) Assignee: Sprint Spectrum L.P., Overland Park, KS (US)

(*) Notice: Subject to any disclaimer, the term of this patent is extended or adjusted under 35 U.S.C. 154(b) by 248 days.

(21) Appl. No.: 10/341,233

(22) Filed: Jan. 13, 2003

(51) Int. Cl.
*H04M 11/00* (2006.01)
*H06F 17/60* (2006.01)

(52) U.S. Cl. .................. 455/406; 455/408; 455/414.1; 705/14; 705/40

(58) Field of Classification Search ........ 455/406–408, 455/414.1, 414.3, 550.1, 551; 705/14, 27, 705/34, 40; 379/111, 114.01, 114.05, 114.12
See application file for complete search history.

(56) References Cited

U.S. PATENT DOCUMENTS

| | | | |
|---|---|---|---|
| 5,466,919 A * | 11/1995 | Hovakimian ................. 705/17 |
| 5,768,370 A | 6/1998 | Maatta et al. ................ 379/433 |
| 5,848,152 A | 12/1998 | Slipy et al. .................. 379/433 |
| 6,415,264 B1 * | 7/2002 | Walker et al. ................ 705/26 |
| 6,795,707 B1 * | 9/2004 | Martin et al. ................ 455/446 |
| 2001/0032193 A1 | 10/2001 | Ferber .......................... 705/79 |
| 2002/0002527 A1 | 1/2002 | Holtzman ..................... 705/37 |
| 2002/0013728 A1 * | 1/2002 | Wilkman ...................... 705/14 |
| 2002/0065721 A1 | 5/2002 | Lema et al. ................... 705/14 |
| 2002/0084700 A1 | 7/2002 | DeLeeuw .................... 307/140 |
| 2002/0091571 A1 * | 7/2002 | Thomas et al. ............... 705/14 |
| 2002/0133817 A1 | 9/2002 | Markel ........................ 725/23 |
| 2002/0174036 A1 * | 11/2002 | Coyle ........................... 705/27 |
| 2003/0017848 A1 | 1/2003 | Engstrom et al. ........... 455/558 |
| 2003/0036362 A1 | 2/2003 | Buesseler et al. ............ 455/90 |
| 2003/0065805 A1 | 4/2003 | Barnes, Jr. ................... 709/231 |
| 2003/0073462 A1 | 4/2003 | Zatloukal et al. ........... 455/558 |

* cited by examiner

*Primary Examiner*—Binh K. Tieu

(57) ABSTRACT

An affinity market system may be implemented in a wireless network. A mobile station may make billable transactions via the wireless network, and each billable transaction made by the mobile station may be associated with an affinity partner. The wireless network may provide a rebate to the affinity partner for the billable transactions made by the mobile station via the wireless network.

27 Claims, 5 Drawing Sheets

SYSTEM AND METHOD FOR AFFINITY MARKETING IN A WIRELESS NETWORK

FIELD OF THE INVENTION

This invention relates generally to wireless networks. More specifically, it relates to a system and method for affinity marketing in wireless networks.

BACKGROUND OF THE INVENTION

Many businesses market their products and services to consumers. Marketing provides an effective way for a business to increase its exposure to consumers, and many different programs exist to market products and services. For example, a business may advertise its products and services on radio, television, billboards, newspapers or other such mediums. In response to this marketing, consumers have greater exposure to the business's products and services, and they are more likely to purchase these advertised products and services than to purchase unadvertised products services from the business' competitors. This in turn generates increased sales and revenue for the business.

When different businesses advertise similar products, the competing advertisements may lose their effectiveness because a consumer may be unable to discern a noticeable difference that would warrant choosing one product over another product. For example, many different manufactures make mobile phones that can be used to access one or more different wireless telecommunication networks. The manufacturers generally engage in extensive advertising to generate brand loyalty and to differentiate their products from competitors' products, thereby prompting a consumer to buy their products. Similarly, service providers for the wireless networks often engage in extensive advertising to prompt a consumer to subscribe to their wireless network. The consumer may see the many available choices but have little reason to select one manufacturer or service provider over another. Thus, it would be beneficial to manufacturers and service providers to create an extra incentive for a consumer to select their products or services over a competitor's products or services.

Other industries have developed incentive programs in order to entice a consumer to select their products over a competitor's advertised products. For example, credit card companies use an incentive program in order to provide an extra incentive for a consumer to select credit cards for a particular company. In this type of a program a credit card company offers a credit card that includes a logo from one of a variety of different affinity partners, such as universities. The consumer can then select the logo of their favorite university to have on their particular card. In addition to providing a credit card with the logo, the credit card company also pays a rebate to the affinity partner for each purchase made using the credit card.

The rebate to the consumer's university provides an extra incentive for the consumer to obtain a credit card from the credit card company offering a card with the logo, because the consumer knows that purchases made using this card will benefit the consumer's university. Thus, the credit card company uses the consumer's school loyalty in order to promote its products over competing products. By exclusively licensing the right to use the university's logo, or by obtaining one of a small number of available licenses, the credit card company can offer a selection of different logos that are not available from competing companies. Other similar programs may pay a cash-back rebate directly to the consumer instead of using an affinity partner.

SUMMARY OF THE INVENTION

A mobile station may access a wireless network, and a user of the mobile station may make billable transactions via the wireless network. The mobile station may be associated with an affinity partner. In one embodiment, the mobile station may include an affinity identification module that can be used to provide an identifier for the affinity partner. When accessing the wireless network in order to make a billable transaction, the mobile station may provide the identifier for the affinity partner, thereby allowing the wireless network to associate the mobile station's billable transaction with a particular affinity partner.

When the mobile station makes a billable transaction via the wireless network, the wireless network may determine the affinity partner associated with the mobile station for that billable transaction. For example, the wireless network may receive the identifier for the affinity partner from the mobile station. The wireless network may then pay a rebate for that billable transaction to the affinity partner.

In one exemplary embodiment, a user of the mobile station may change the affinity identification module, thereby also changing the affinity partner for the mobile station. In one example, an affinity identification module may be included in a detachable faceplate. The user may then change affinity partners by changing the detachable faceplates on the mobile station. Other methods may also be used to change the affinity partner.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
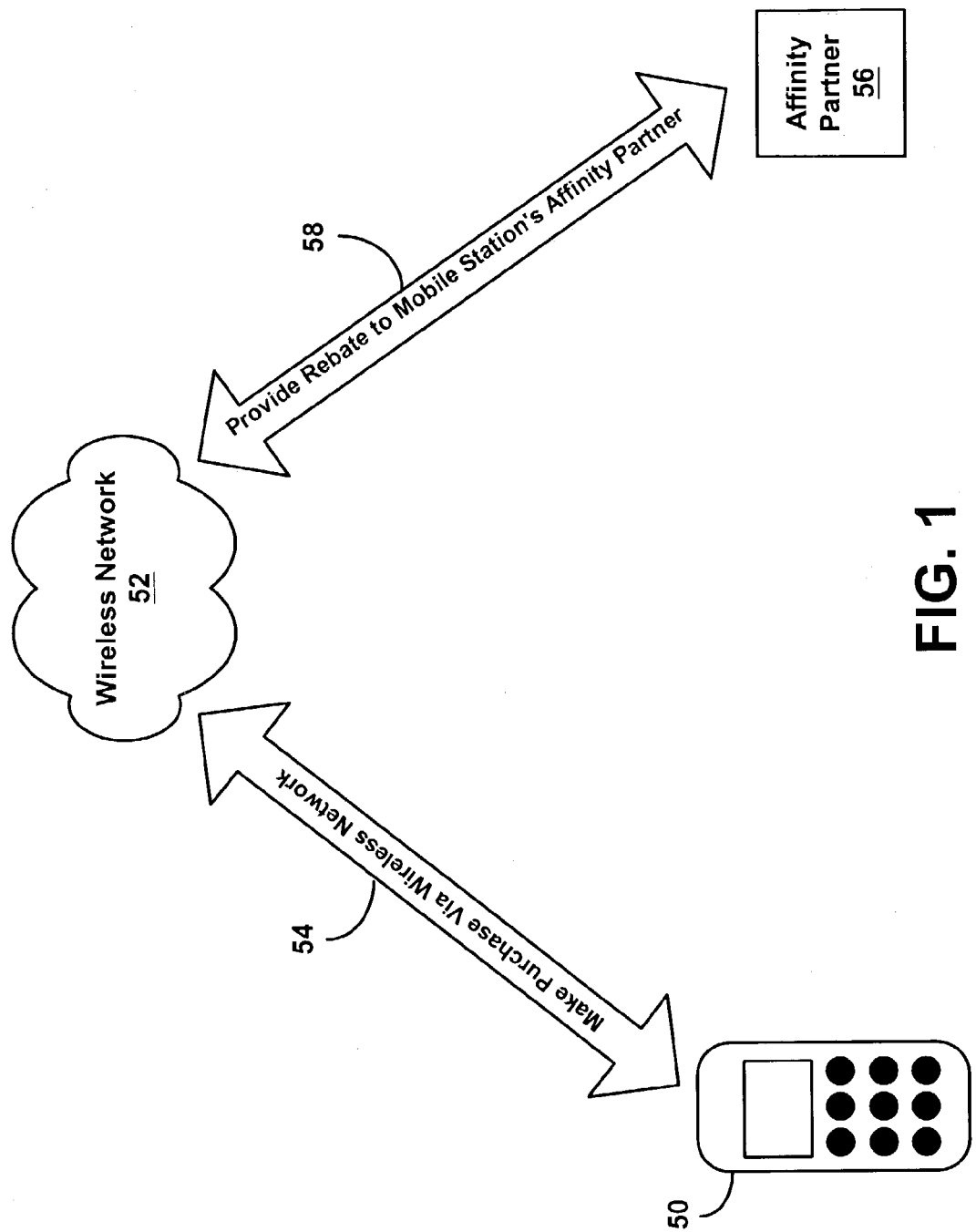
FIG. 1 is a flow diagram of a system for affinity marketing in a wireless network.

FIG. 1 is a flow diagram of a system for affinity marketing in a wireless network. As shown in FIG. 1, a mobile station 50 wirelessly communicates with a wireless network 52. For example, the mobile station 50 may access the wireless network 52 to engage in voice calls or to exchange data with another device. Additionally, the mobile station 50 may make billable transactions, such as purchases, via the wireless network 52, as shown by arrow 54. The mobile station 50 may be a user-controlled device, and while this discussion refers to the mobile station 50 making purchases or taking other actions, it should be understood that these actions may be in response to one or more commands from a user.

The mobile station 50 may make a variety of different purchases via the wireless network 52. For example, the mobile station 50 may purchase content directly from the wireless network 52. The content may be sent from the wireless network 52 to the mobile station 50 where it may then be installed and executed on the mobile station 50. A service provider for the wireless network 52 may then directly bill a user for the mobile station 50 for the downloaded content, such as by including a charge for the content in the user's monthly bill.

In another example, the mobile station 50 may purchase content through the wireless network 52 but not directly from the wireless network 52. Thus, the wireless network 52 may provide the mobile station 50 with content on behalf of a content provider. In completing the purchase, the wireless network 52 may obtain the content from a content provider and then provide the content to the mobile station 50, thereby serving as an intermediary between the content provider and the mobile station 50. In an alternate embodiment, the content provider may communicate directly with the mobile station 50 in order to provide the content to the mobile station 50.

As is common in this type of scheme, the wireless network 52 may bill a user for the mobile station 50 for the content purchased from the content provider, and the wireless network 52 may then reimburse the content provider for the purchase price of the content. Sometimes termed billing on behalf of ("BOBO"), this arrangement allows the user to receive a single bill for content purchased from a variety of different content providers. For example, the user's monthly bill may include charges for content purchased from one or more content providers.

In addition to reimbursing the content provider for the purchase price of the content, the wireless network 52 may also provide a rebate for the purchase to an affinity partner 56 of the mobile station 50, as shown at arrow 58. Thus, the mobile station's affinity partner 56 receives a rebate for purchases made by the mobile station 50 via the wireless network 52.

The purchases may be a variety of different types of purchases. In one embodiment, the purchases may be content that is purchased and downloaded to the mobile station 50. For example, the mobile station 50 may purchase executable programs, ring tones, screen savers or other content that may be downloaded to the mobile station 50. It is also possible that the mobile station 50 may purchase content without downloading it to the mobile station 50 or may download the content at a later time. Of course, these are merely examples and many other types of content and purchasing methods may also be used.

In another embodiment, the billable transactions, and thus the purchases made by the mobile station 50, may be charges for accessing the wireless network 52. For example, the mobile station 50 may be charged for airtime, long distance, roaming, voice mail, call waiting or other services provided by the wireless network 52. Alternatively, the mobile station 50 may also be changed for mega-bytes or other measures of data sent through the wireless network 52, instant messaging ("IM") services or other such data services. Although incurring these types charges services provided by the wireless network 52 does not per se involving downloading content to the mobile station 50, these billable transactions may be treated as purchases for affinity marketing. Thus, the affinity partner 56 may in turn receive a rebate for these types of charges, or for other charges, incurred by the mobile station 50.

The affinity partner 56 may be any entity. For example, the affinity partner 56 may be a university, such as the University of Kansas. The affinity partner 56 may also be any other educational institution, such as an elementary school, middle school, high school, vocational school, religious school or technical school. The affinity partner may also be a sports team. In another example, the affinity partner 56 may be a professional society, such as the Institute of Electrical and Electronics Engineers ("IEEE") or the American Medical Association ("AMA"). The affinity partner 56 may also be a civic organization, such as Rotary International or Kiwanis International. The affinity partner 56 may also be a business, charitable organization, non-for-profit entity or another type of entity. This list is not exhaustive, and many other entities may be used as the affinity partner 56.

It is not necessary, however, that the affinity partner 56 be limited to an entity, such as the ones previously described. The affinity partner 56 may itself be another affinity marketing program. For example, the affinity partner 56 may be an airline miles program that provides a participant with airline miles for purchases. Instead of paying a rebate only to the affinity partner 56, the user for the mobile station 50 may receive all or a portion of the rebate from the other affinity marketing program. The rebate paid to the user may be airline miles or another similar benefit of the affinity program. In another variation, the affinity partner 56 may be a cash-back program that pays all or a portion of the rebate to the user as a cash-back rebate for purchases made via the wireless network 52.

The affinity partner 56 may be associated with the mobile station 50 in a variety of different ways. For example, the mobile station 50 may include an affinity identification module operatively connected to the mobile station 50. The affinity identification module may itself identify the affinity partner 56 to the wireless network 52. For example, the affinity identification module may store a unique code or other identifier for the affinity partner 56. Once the affinity identification module is operably connected to the mobile station 50, the mobile station 50 is able to retrieve the unique code from the affinity identification module and provide the unique code to the wireless network 52 when making purchases. The wireless network 52 can then use the unique code to associate the affinity partner 56 with the mobile station's purchase.

The unique code may be any identifier, such as a numeric identifier, an alphanumeric identifier, an alphabetic identifier, or another type of identifier. In one embodiment, the unique code may be unique to each affinity identification module. Thus, the wireless network 52 may be able to associate a particular code not only with an affinity partner but also with a specific affinity identification module. In another embodiment, the unique code may be unique to each affinity partner. In that case, if two different affinity identification modules identify the same affinity partner, then they would also use the same unique code.

The affinity identification module may operatively connect to the mobile station 50 in a variety of different ways. For example, the mobile station 50 may be a mobile phone, and the affinity identification module may be a faceplate for the mobile phone. The faceplate may include a smart card, a Java card, a security identity module ("SIM") card, an RF id tag, an integrated circuit, an application specific integrated circuit ("ASIC"), a memory module, or another type of storage mechanism that stores an identifier for the affinity partner 56. Once the faceplate is operatively connected to the mobile phone, for example in a manner that allows the mobile phone to access the faceplate's affinity identification module, the mobile phone can retrieve the identifier for the affinity partner 56.

In addition to retrieving the identifier for the affinity partner 56, the mobile phone may also authenticate the affinity identification module. For example, the mechanism that stores the identifier for the affinity partner 56 may also store a digital signature, such as one provided by the wireless network 52. The mobile station 50 can use the digital signature to authenticate the affinity identification module. Alternatively, the mobile station 50 might provide the digital signature to the wireless network 52, which can in turn authenticate the affinity identification module. The authentication process can be used to ensure that the affinity partner identified in the storage mechanism is the same as the affinity partner represented to the user, such as via the logo printed on the affinity identification module or packaging for the affinity identification modules. This can help prevent a merchant from fraudulently concealing the true identity of the affinity partner of an affinity identification module sold to the consumer.

In another embodiment, the affinity identification module may itself directly connect to the mobile station 50 instead of being integrated into an apparatus, such as the faceplate. For example, the affinity identification module may itself be a smart card, a Java card, a security identity module ("SIM") card, an integrated circuit, an application specific integrated circuit ("ASIC"), a memory module or another storage mechanism that directly connects to the mobile station 50. Thus, the mobile station 50 may be associated with the affinity partner 56 by connecting the affinity identification module directly to the mobile station 50. Once connected to the mobile station 50, the affinity identification module may be similarly authenticated prior to use.

In another embodiment, the identity of the affinity partner 56 may be preprogrammed into the mobile station 50, and thus the affinity identification module may be an integrated part of the mobile station's circuitry. For example, the mobile station's manufacturer, a service provider for the wireless network 52, a distributor of the mobile station or another entity, may preprogram the mobile station 50 with the identity of an associated affinity partner 56. Once preprogrammed, the mobile station 50 may then use that affinity partner 56 for affinity marketing without requiring any additional external components to be attached. Alternatively, the affinity partner may be identified within content downloaded and run on the mobile station 50. For example, the affinity partner could be identified in the descriptor file for a Java programming running on the mobile station 50.

In yet another embodiment, the user may program the mobile station 50 with the identity of the affinity partner 56. For example, the user may type of the name of the affinity partner 56 into the mobile station 50, such as by using a graphical user interface or other input mechanism for the mobile station 50. In another example, the user may select from a list of affinity partners provided by the mobile station 50. The list of affinity partners may be programmed into the mobile station 50, and the user may simply select one of the affinity partners from the list.

As part of making the selection, the mobile station 50 may download a list of currently available affinity partners from the wireless network 52. The mobile station 50 may then display the current list of affinity partners, and the user may select one of the affinity partners from the list. Downloading the current list of affinity partners provides an efficient way to add or remove the available affinity partners, thereby allowing the wireless network 52 more flexibility managing the available affinity partners.

In yet another embodiment of associating an affinity partner with a mobile station the wireless network 52 may store a database that associates a particular affinity partner with a mobile station. Alternatively, the wireless network 52 may access a database stored at another location. A mobile station may be uniquely identified by its electronic serial number ("ESN"), mobile identification number ("MIN") or other unique identifier. The database may store records that correlate a mobile station's identifier, or combination of identifiers, with a particular affinity partner.

The database may be configured at any time. For example, the user may select an affinity partner when the user initially subscribes to the wireless network. The user's selection may then be programmed into the database along with identifiers for the user's mobile station. The user may also change the selection at a later time. Once the wireless network 52 receives an identification of the mobile station 50, such as by receiving its ESN, MIN or other identifier when the mobile station 50 accesses the wireless network 52 to make a purchase, the wireless network 52 can then access the database to determine the affinity partner associated with the mobile station 50.

Figure 2:
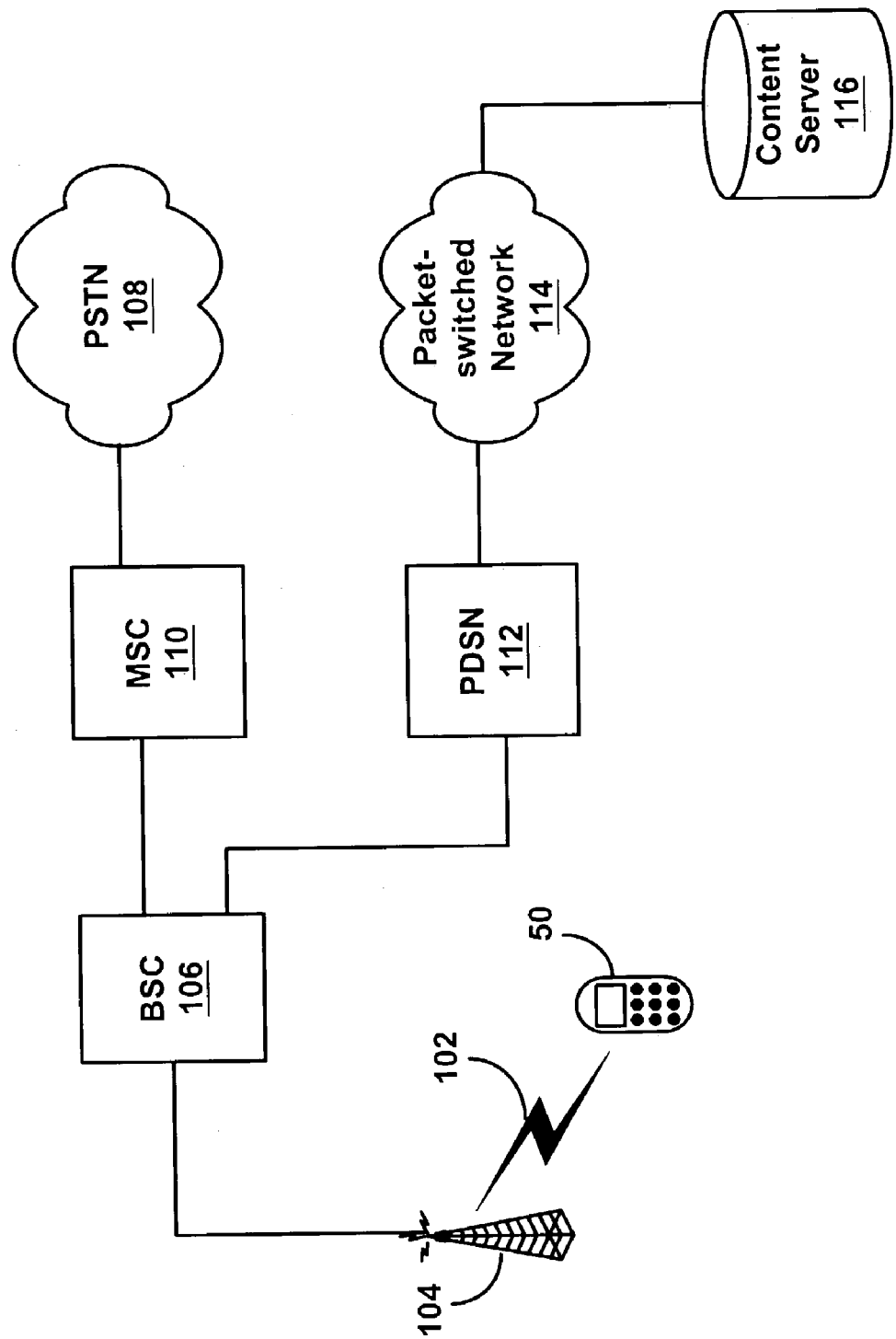
FIG. 2 is a block diagram of an exemplary wireless network, such as can be used as the wireless network of FIG. 1.

FIG. 2 is a block diagram of an exemplary wireless network, such as can be used as the wireless network of FIG. 1. As depicted in FIG. 2, the mobile station 50 communicates over an air interface with a base station 104. The mobile station 50 may be any wireless device, such as a mobile phone, a pager, a two-way radio, a wireless personal digital assistant ("PDA"), a wirelessly equipped computer or another wireless device.

The mobile station 50 may communicate with the base station 104 via the air interface 102 using a variety of different protocols. In an exemplary embodiment, the mobile station 50 communicates with the base station 104 using Code Division Multiple Access ("CDMA"), such as in a CDMA2000 3G packet data network. CDMA provides a method for sending wireless signals between the mobile station 50 and the base station 104. In a CDMA system, the base station 104 communicates with the mobile station 50 over a spread spectrum of frequencies, thereby allowing multiple mobile stations to simultaneously communicate with the base station 104 over the same range of frequencies.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other protocols may also be used for communication over the air interface 102. For example, the mobile station 50 and the base station 104 may communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Wireless Application Protocol ("WAP"), Time Division Multiple Access ("TDMA") or other protocols. Additional wireless protocols, IEEE 802.11, Bluetooth and others may also be used.

The base station 104 couples to a base station controller ("BSC") 106, which can perform various functions such as managing handoffs of the mobile station 50 as it moves among other base stations. The BSC 106 in turn connects to a mobile switching center ("MSC") 110. The MSC 110 can manage setup and teardown of connections with the mobile station 50. While the BSC 106 and the MSC 110 are depicted as separate components, it is possible that their functionality may be combined into a single component. The MSC 110 can additionally provide connectivity to the public switched telephone network ("PSTN") 108. Using the connectivity, the mobile station 50 may then communicate with another device that is also connected to the PSTN 108.

In addition to connecting to the MSC 110, the BSC 106 may also connect with a packet data-serving node ("PDSN") 112. The PDSN 112 in turn provides connectivity to a packet-switched network 114. The packet-switched network 114 may be, for example, the core packet-switched network of the wireless network, which may in turn connect to another packet-switched network, such as an intranet or the Internet. Alternatively, the packet-switched network 114 may be an intranet, the Internet or another packet-switched network. Using the connectivity provided by the PDSN 112, the mobile station may communicate with one or more devices on the packet-switched network 114.

Using the connectivity provided by the wireless network, the mobile station 50 may also purchase content. For example, the content may be downloaded from a content server 116. As shown in FIG. 2, the content server 116 connects to the packet-switched network 114. The content server 116, however, may reside at other locations than on the packet-switched network 114. While FIG. 2 depicts a content server 116, it should be understood that it is not necessary that a server store the content. The content may be stored by any other type device or storage medium. For example, the content may be stored in a database or other storage mechanism, which can be accessed to retrieve the content. Alternatively, portions of the content may be distributed among more than one location, and the content may then be reassembled in response to a request from the mobile station 50 for the content.

Figure 3:
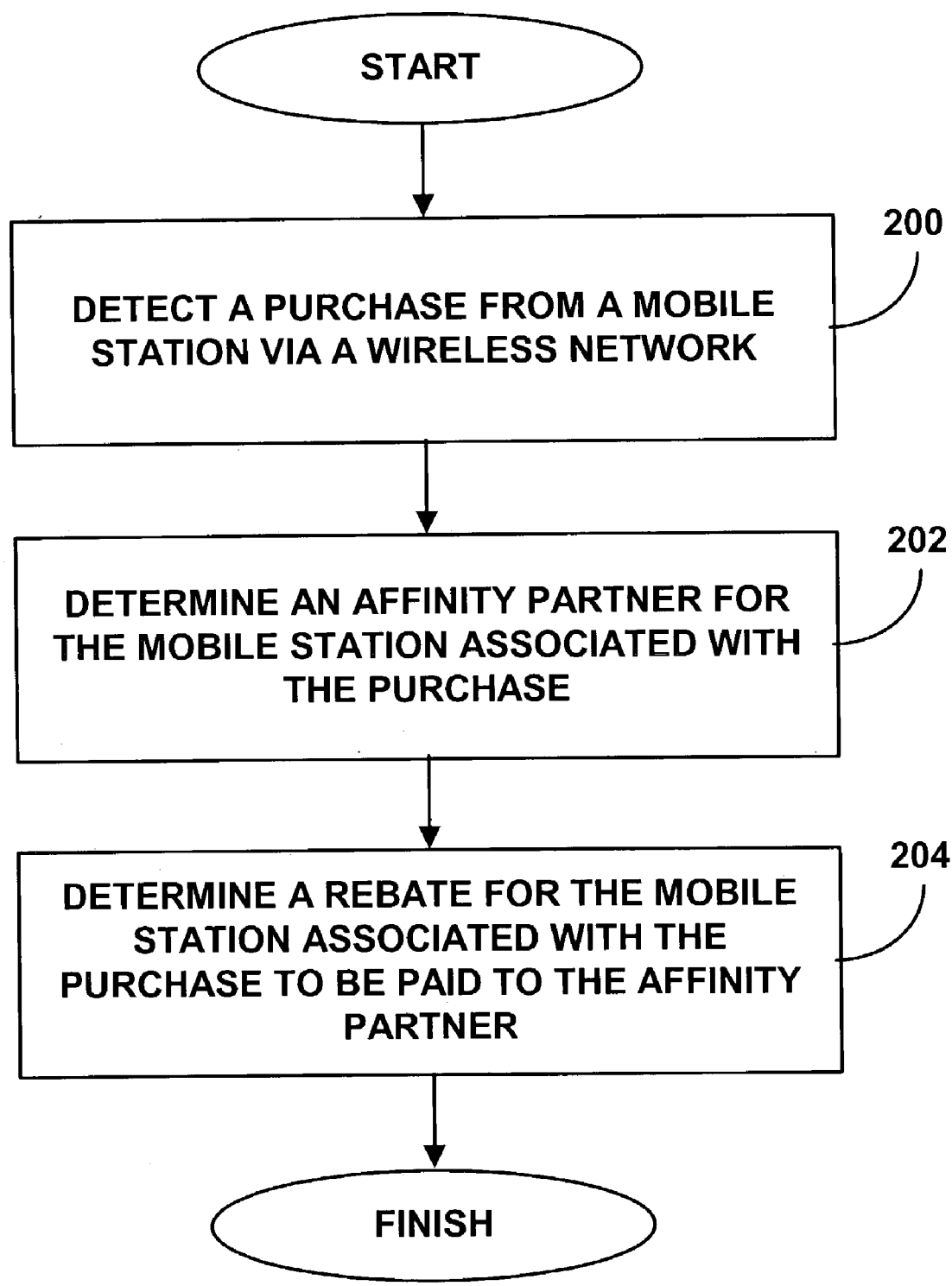
FIG. 3 is a flowchart of an exemplary method for affinity marketing in a wireless network, such as can be used with the wireless network of FIG. 2.

FIG. 3 is a flowchart of an exemplary method for affinity marketing in a wireless network, such as can be used with the wireless network of FIG. 2. At Step 200, the wireless network first detects a purchase from a mobile station via the wireless network. For example, the mobile station may initiate a purchase via the wireless network, such as can be done using conventional methods for purchasing content from a wireless network or from another content provider. The mobile station may initiate a purchase of any type of content, such as executable programs, screen savers, ring tones, or any other type of available content.

As previously described, affinity marketing may also be used when the mobile station incurs charges for the services provided by the wireless network without actually directly downloading content to the mobile station. In this case, the purchases may be the charges for services provided by the wireless network. Thus, detecting the purchase via the wireless network may simply be detecting that the mobile station is accessing the wireless network and incurring charges for one or more of the services. In fact, detecting the purchase can include detecting any mobile-commerce ("m-commerce") transaction.

Then, at Step 202, the wireless network determines an affinity partner for the mobile station associated with the purchase. The affinity partner may be determined in a variety of different ways. In one example, the mobile station may provide the wireless network with an identification of the affinity partner, such as by providing the unique code for the affinity partner stored in the mobile station's affinity identification module. The mobile station may provide the unique code or other identifier to the wireless network as part of the information sent to the wireless network in order to complete the purchase. Once the wireless network receives the code, it may then determine the corresponding affinity partner. For example, the wireless network may access a database that correlates unique identifiers and affinity partners, such as by storing a mapping between the identifiers and their respective affinity partners.

In another example, the wireless network may use the ESN, MIN or other mobile station identifier to determine the affinity partner. For example, the wireless network ordinarily receives these identifiers when the mobile station accesses the wireless network. The wireless network may then use one or more of these identifiers to determine the affinity partner for the mobile station, such as by accessing a database that correlates these identifiers with an affinity partner for the mobile station. The database may, for example, store a mapping between one or more of the identifiers for a mobile station and the respective affinity partner. By accessing the database, the wireless network can determine which specific affinity partner corresponds to the identifiers for a particular mobile station.

Finally, at Step 204, the wireless network determines a rebate for the mobile station associated with the purchase to be paid to the affinity partner. The rebate may be determined in a variety of different ways. In one embodiment, the wireless network accesses a database that correlates rebate amounts with affinity partners. For example, the database may correlate a particular rebate percentage with an affinity partner. To determine a rebate amount, the wireless network first determines the rebate percentage associated with the affinity partner and then applies the rebate percentage to the purchase price.

Various different modifications may be made. In one embodiment, an affinity partner is associated with a single rebate percentage that is used for all mobile stations that select that affinity partner. In another embodiment, the affinity partner is associated with more than one percentage, thereby allowing different mobile stations to have different rebate percentages for the same affinity partner. Thus, the particular rebate percentage for a purchase would be specific to not only the affinity partner but also to the mobile station making the purchase.

While the previously described embodiments refer to a rebate percentage, it should be understood that the rebate paid to the affinity partner is not limited to a particular percentage of the purchase price. For example, the rebate may be a fixed amount per purchase. In another example, the rebate may be a percentage of the purchase price in conjunction with a fixed minimum and/or maximum rebate amount.

In yet another embodiment, the affinity partner may itself be another affinity program. For example, the affinity partner may be an airline mile program or another revenue sharing program. In this case, the rebate may be airline miles or another commodity provided to the mobile station user. The other program may pay a rebate to the Wireless network, which may in turn pay all or part of the rebate back to the mobile station user.

Once the wireless network determines the rebate to be paid to the affinity partner, the wireless network pays the rebate to the affinity partner. For example, the wireless network may store records of the various rebates to be paid to an affinity partner. Then, the wireless network may pay to the affinity partner the various rebates, such as on a monthly or other recurring basis. Alternatively, all or part of the rebate may be paid to the mobile station user, for example in an airline mile or cash-rebate program. By aggregating the rebate payments, the wireless network can reduce the administrative costs that would otherwise be associated with making individual rebates payments for each transaction. Thus, paying the rebate may occur days or months later than the actual purchase.

In one alternate embodiment, the rebate may be paid to the affinity partner by an entity other than the wireless network. For example, when in used in conjunction with an other affinity marketing program, the other affinity marketing program may pay all or part of its rebate directly to the user for the mobile station. In another example, the wireless network may outsource its handling of the rebates, such that the rebates paid to the affinity partners come from an entity other than the wireless network.

Figure 4:
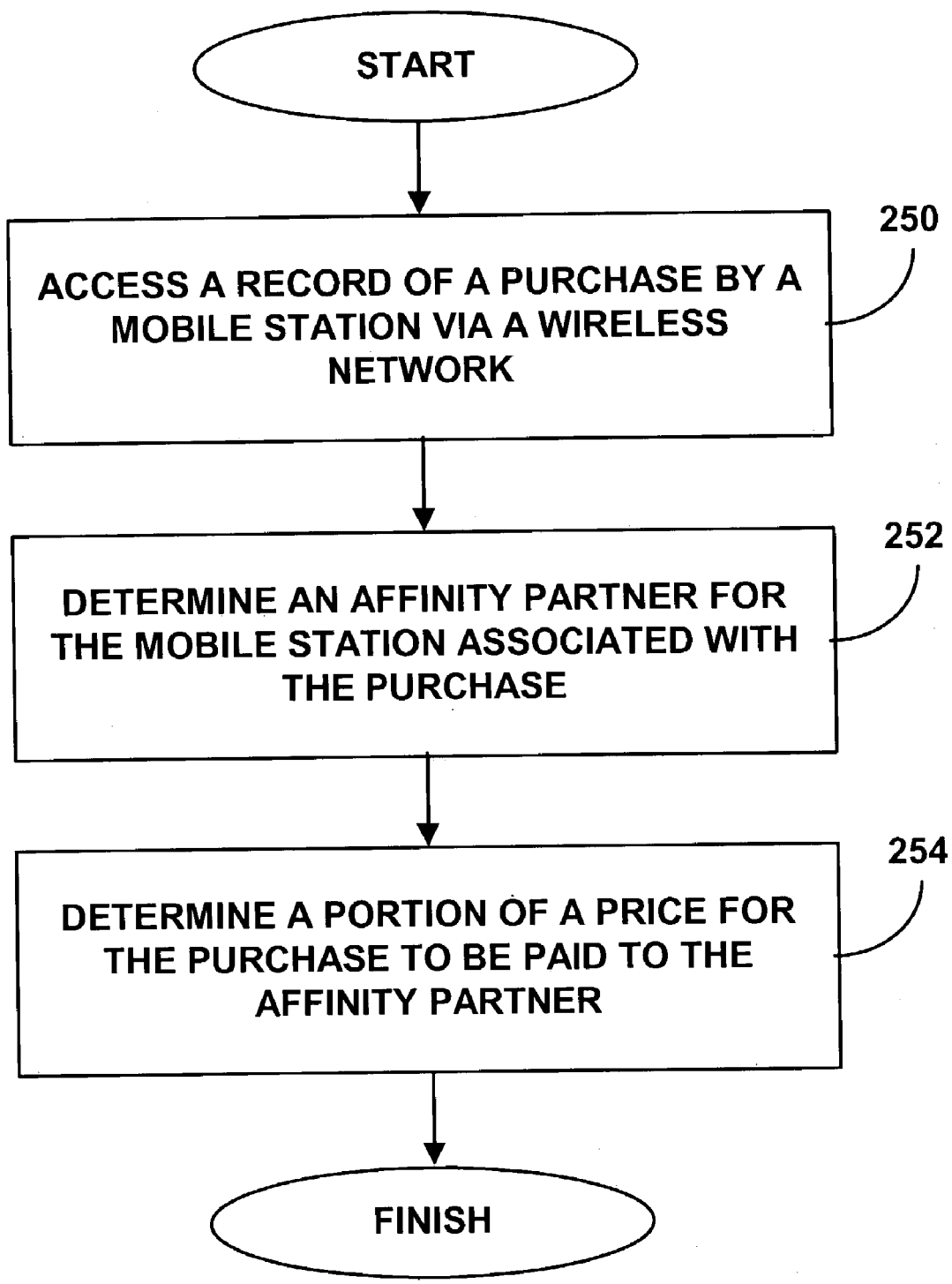
FIG. 4 is a flowchart of an alternate embodiment of a method for affinity marketing in a wireless network, such as can be used with the wireless network of FIG. 2.

FIG. 4 is a flowchart of an alternate embodiment of a method for affinity marketing in a wireless network, such as can be used with the wireless network of FIG. 2. The wireless network may store records for purchases made by the mobile station, and at a later time the wireless network may access the records in order to determine rebates to be paid to affinity partners for the mobile station. The method described in FIG. 4 may be used, for example, to access records for purchases at a later time in order to compute rebates to be paid to affinity partners for the purchases.

At Step 250, the wireless network accesses a record of a purchase by a mobile station via the wireless network. For example, the wireless network may store records of purchases made by the mobile station. As previously described the purchases may be charged incurred by the mobile station for accessing the wireless network, and in this case the wireless network may access usage records for the mobile station. The purchases may also be content that is directly downloaded to the mobile station.

It should be understood that while this discussion refers to the wireless network taking various actions, such as accessing purchase records and determining affinity partners, these actions may be performed by software running on the wireless network. Additionally, they may be performed by a person, or may involve a combination of automated and manual steps.

At Step 252, the wireless network determines an affinity partner for the mobile station associated with the purchase. For example, each record may also store the unique identifier of the affinity partner for the mobile station when the purchase was made. The wireless network may, for example, use a stored database to correlate the unique identifier with its corresponding affinity partner. In another embodiment, the wireless network may determine the mobile station's current affinity partner, and it may then associate the current affinity partner with the purchase. Thus, the affinity partner used for the rebate may be the affinity partner for the mobile station at the time of the purchase, or it may be the affinity partner for the mobile station at the time the rebate is computed.

Finally, at Step 254, the wireless network determines a portion of the price for the purchase to be paid to the affinity partner. The may be done, for example, by accessing a database that correlates a rebate with affinity partner. For example, the database may specify a rebate percentage, a rebate amount or another measure to be used in computing the rebate to be paid to the affinity partner.

In one exemplary embodiment, the process described in FIG. 4 may be performed once or may be performed at random intervals. In another exemplary embodiment, the wireless network may use the process described in FIG. 4 on a periodic basis. For example, the wireless network may use the process described in FIG. 4 on a daily, monthly, yearly or other periodic basis in order to compute rebates to be paid to affinity partners. Determining the rebates periodically may reduce the administrative overhead that would otherwise be incurred with computing and paying the rebates contemporaneously with each purchase.

Figure 5:
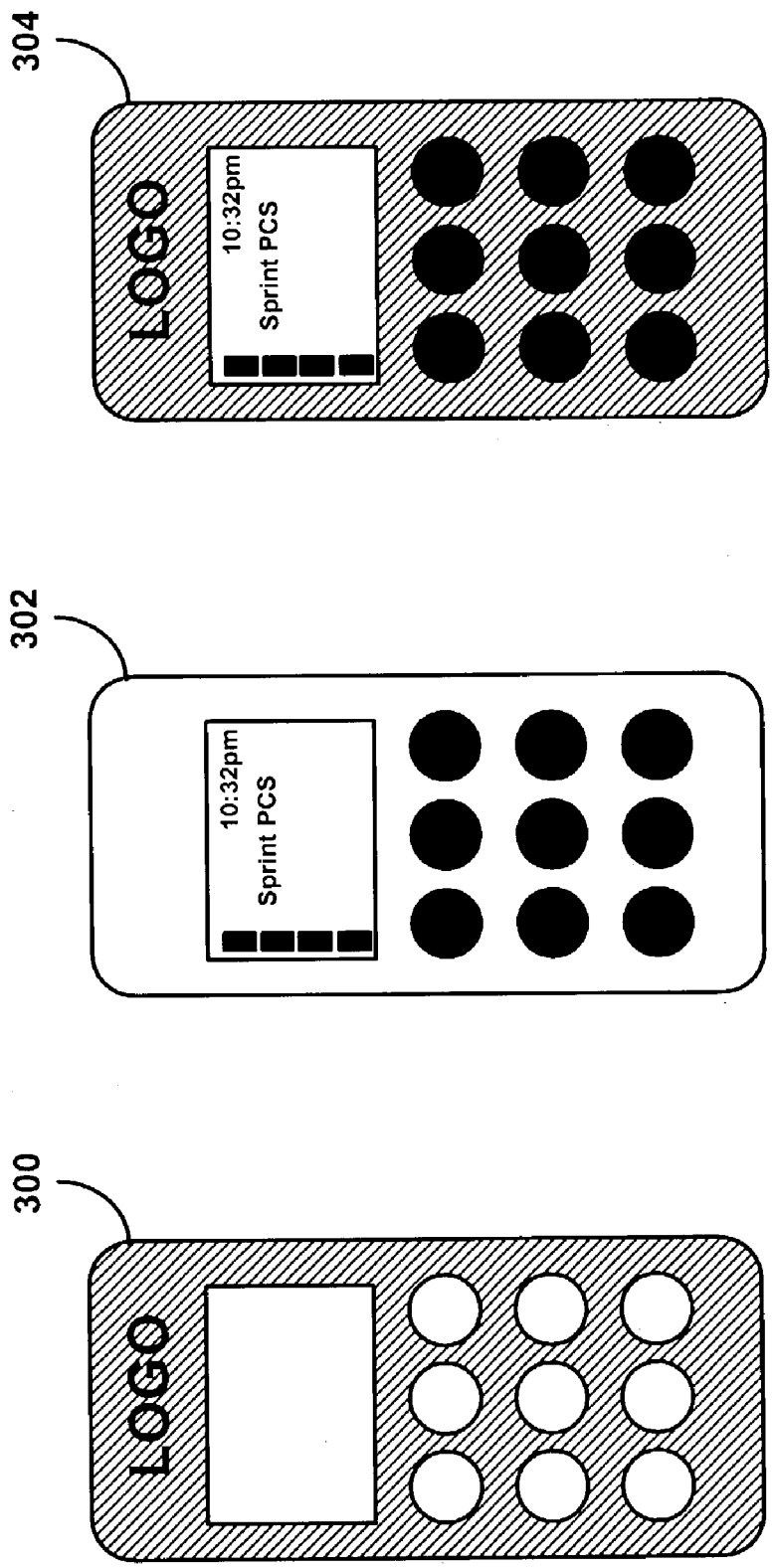
FIG. 5 is a block diagram of a detachable faceplate for a mobile phone that can be used to associate an affinity partner with the mobile phone.

FIG. 5 is a block diagram of a detachable faceplate for a mobile phone that can be used to associate an affinity partner with the mobile phone. FIG. 5 depicts a detachable faceplate 300 that may be used as the affinity identification module to associate an affinity partner with a mobile phone 302. As previously described, the detachable faceplate 300 may include a smart card, Java card, SIM card or other circuitry that stored an identifier for the affinity partner.

For a detachable faceplate 300 that includes a smart card, the smart card may additionally cause the phone to be customized. For example, the smart card may automatically set the ring tones for the mobile station, change other configuration settings of the mobile phone, add additional numbers to the mobile station's address book or make other customizable changes. These can be done automatically after attaching the detachable faceplate 300. In one embodiment, the previous settings can be restored when the detachable faceplate is subsequently removed. In another embodiment, the changed settings can remain until modified by a user or another smart card.

As depicted in FIG. 5, the detachable faceplate 300 also includes a logo for the affinity partner. This allows the user of the mobile phone 302 to easily identify the affinity partner associated with the detachable faceplate 300. Displaying the logo for the affinity partner also allows the detachable faceplate 300 to be more easily marketed to mobile station users. A user may be more inclined to purchase the faceplate, for example one including the logo of the user's favorite university, since the user could then openly display support for the user's university. Displaying the logo also provides advertisement for the affinity partner, thereby also encouraging potential affinity partners to participate in the affinity marketing program with the wireless network.

The detachable faceplate 300 can be affixed to the mobile phone 302, as shown at 304. Once attached to the mobile phone 302, the mobile phone 302 may access the affinity identification module in order to retrieve an identifier for the affinity partner. By using a detachable faceplate, it may easily be removed by the mobile phone's user. For example, the mobile phone's user can easily switch between detachable faceplates, and thereby also between affinity providers, on the same mobile phone 302. Additionally, the mobile phone user may easily switch the detachable faceplate 300 to a different mobile phone. This can allow the mobile phone user to keep the same affinity provider even though the user may switch mobile phones.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method comprising:
   transmitting, via the wireless network, to a mobile station, a list of affinity partners;
   receiving in response, via the wireless network, from the mobile station, a user selection of a given affinity partner from the list;
   recording in data storage a correlation between the selected affinity partner and the mobile station;
   detecting a billable transaction from the mobile station via the wireless network; and
   responsive to detecting the billable transaction, determining and recording a rebate amount to be paid to the selected affinity partner.

2. A computer readable medium having stored therein instructions for causing a central processing unit to execute the method of claim 1.

3. The method of claim 1, wherein determining a rebate for the billable transaction to be paid to the selected affinity partner comprises accessing a database, wherein the database stores rebate computation information used in computing rebates for the selected affinity partner.

4. The method of claim 1, wherein the selected affinity partner is a user of the mobile station and wherein the rebate is a cash-back rebate paid to the user.

5. The method of claim 1, wherein the wireless network is a CDMA telecommunications network.

6. The method of claim 1, wherein recording the correlation includes recording, in a database, a mapping between the selected affinity partner and a mobile identification number of the mobile station.

7. The method of claim 1, wherein recording the correlation includes recording, in a database, a mapping between the selected affinity partner and an electronic serial number of the mobile station.

8. A method comprising:
   transmitting, via a wireless network, to a mobile station, a list of affinity partners;
   receiving in response, via the wireless network, from the mobile station, a user selection of a given affinity partner from the list;
   conducting a billable transaction with the mobile station via the wireless network;
   creating a record of the transaction, wherein the record correlates the billable transaction with the selected affinity partner; and
   based on the record of the transaction, determining and recording a rebate amount to be paid to the selected affinity partner.

9. A computer readable medium having stored therein instructions for causing a central processing unit to execute the method of claim 8.

10. The method of claim 8, wherein the billable transaction is a charge for airtime minutes, long distances services or roaming services used by the mobile station.

11. The method of claim 8, wherein the billable transaction is a charge for content purchased via the mobile station.

12. The method of claim 8, wherein the billable transaction is a charge for data services used by the mobile station.

13. The method of claim 8, wherein the record includes an identifier for the affinity partner, and wherein the identifier was provided to the wireless network when the mobile station made the billable transaction.

14. The method of claim 8, wherein the affinity partner is a second affinity marketing program that pays a second rebate to the user of the mobile station.

15. A system for implementing affinity rebates in a wireless network, the system comprising:
   a mobile station for accessing the wireless network; and
   a detachable faceplate comprising an affinity identification module, wherein the affinity identification module stores an identifier for an affinity partner associated with the mobile station, and wherein, if at the time of a transaction the affinity identification module is operatively connected to the mobile station, the mobile station sends to the wireless network the identifier for the affinity partner to be used in determining a rebate for the transaction to be paid to the affinity partner.

16. The system of claim 15, further comprising logic stored by the mobile station and executable by a processor for (i) accessing the affinity identification module to retrieve the identifier, (ii) communicating with the wireless network in order to make transactions via the wireless network, and (iii) providing the identifier to the wireless network to be used in computing rebates paid to the affinity partner for transactions made using the mobile station via the wireless network.

17. The system of claim 15 wherein the affinity identification module is operatively connected to the mobile station.

18. The system of claim 15, wherein the affinity identification module is a smart card, a Java card, a SIM card or an RF id tag.

19. The system of claim 15, wherein the affinity partner is an educational institution.

20. The system of claim 15, wherein the affinity partner is a sports team.

21. The system of claim 15, wherein affinity identification module is a sum card, a Java card, a SIM card or an RF id tag.

22. The system of claim 15, wherein the affinity partner is a university, and wherein the detachable faceplate displays a logo for the university.

23. The system of claim 15, wherein the affinity partner is a sports team, and wherein the detachable faceplate displays a logo for the sports team.

24. the system of claim 15, wherein the wireless network is a CDMA telecommunications network, and wherein the mobile station is a mobile phone.

25. The system of claim 15, wherein the wireless network is a GSM telecommunications network, wherein the affinity identification module is a SIM card, and wherein the mobile station is a mobile phone.

26. The system of claim 15, wherein identification of the affinity partner is printed on the detachable faceplate.

27. The system of claim 15, wherein a logo of the affinity partner is prinited on the detachable faceplate.

* * * * *